Figure 1:
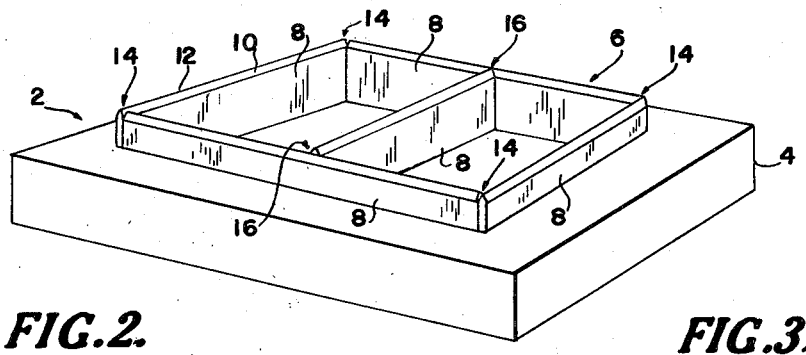

May 11, 1965  E. K. SCOTT ETAL  3,182,530
CONSTRUCTION FOR STEEL RULE CUTTING DIES
Filed April 11, 1961

INVENTORS
ERHARDT K. SCOTT
MAXIMILLIAN L. SCOTT

BY *Cushman, Darby & Cushman*
ATTORNEYS

United States Patent Office 3,182,530
Patented May 11, 1965

3,182,530
CONSTRUCTION FOR STEEL RULE CUTTING DIES
Erhardt K. Scott and Maximillian L. Scott, New York, N.Y., assignors to Accurate Steel Rule Die Manufacturers, New York, N.Y., a partnership
Filed Apr. 11, 1961, Ser. No. 102,306
1 Claim. (Cl. 76—107)

This invention relates to steel rule cutting dies, also known as dinking dies, and particularly to an improvement in the assembling of lengths of cutting rule in abutting relationship in a base member.

One type of known steel rule cutting die includes a flat base and one or more rectangular steel strips, commonly called cutting or creasing rules, each secured along one edge to the base and having a double bevelled, knife-like cutting edge projecting from the base. Conventionally the base is a piece of plywood through which a slot, having the contour of the blank which is desired to be cut from a sheet of material, is jig-sawed. One or more cutting rules, curved or bent if necessary to fit the contours of the slot, are then fitted into the slot where they are held by friction between the rules and the plywood. In use, the completed die is inserted into a stamping press which then forces the cutting edge of the rules into and through the sheet of material. Cutting dies of this type are economically fabricated and are useful for cutting blanks of desired shape from materials such as paper, cardboard, felt, rubber, plastics, asbestos and cloth. These double-bevelled dies, when constructed with several cutting rules which may be butted end-to-end or end-to-side, suffer from several disadvantages as a result of the junction between the end of one cutting rule and the end or side of an adjacent rule. When adjacent rules which lie in different intersecting planes are placed in contact, a space, or nick, remains between the cutting edge of one rule and the cutting edge of another. When the die is pressed against a sheet of material this nick causes a small portion of the sheet to remain uncut, and a tip or ridge appears on the blank at each juncture between rules. In addition, the nick tends to accumulate particles of the sheet, especially when the material of the sheet is fibrous.

The object of the present invention is to overcome these disadvantages of conventionally constructed double-bevelled steel rule cutting dies by providing a smooth transition between the cutting edges of abutting cutting rules.

It is a further object of the invention to eliminate the nick between abutting cutting rules in a conventionally constructed double-bevelled cutting die by shaping the ends of the abutting rules so that the abutting cutting edges engage each other.

Figure 2:
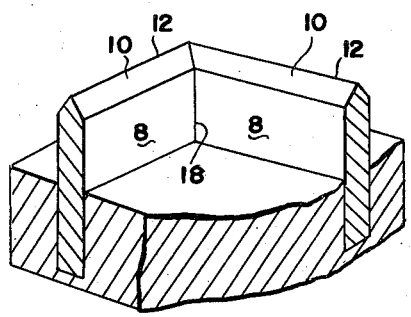
Figure 3:
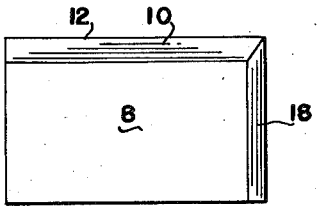
Figure 4:
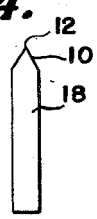
Figure 5:
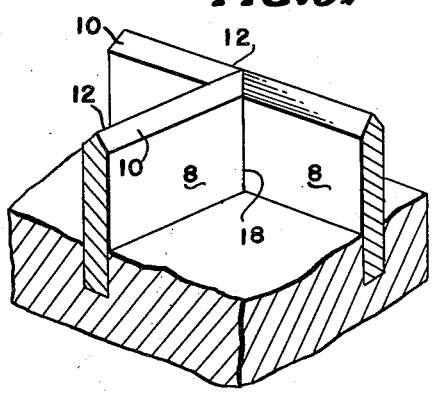
Figure 6:
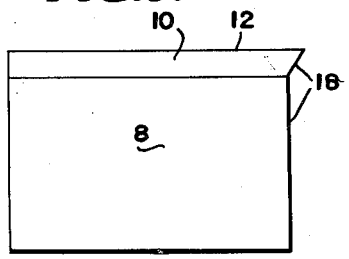
Figure 7:
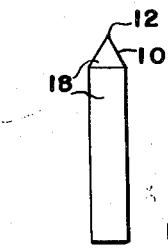

These and other objects and advantages will become apparent from reading the following detailed description of the invention taken in conjunction with the following drawings in which:

FIGURE 1 is a perspective view of a conventionally constructed double-bevelled steel rule cutting die showing the disadvantageous spaces between the cutting edges of abutting rules, FIGURE 2 is a perspective view of an abutment made according to the principles of the present invention between opposed ends of two cutting rules, FIGURE 3 is a side elevation of one of the cutting rules of FIGURE 2, FIGURE 4 is an end elevation of the cutting rule of FIGURE 3, FIGURE 5 is a perspective view of an abutment made according to the principles of the present invention between an end of one cutting rule and the side of another, FIGURE 6 is a side elevation of one of the cutting rules of FIGURE 5 and, FIGURE 7 is an end elevation of the cutting rule of FIGURE 6.

Referring to FIGURE 1 there is shown a double-bevelled steel rule cutting die 2 constructed in the conventional manner. The die 2 consists of a plywood base 4 having a slot cut therein in the configuration of the blank which is to be cut with the die and a plurality of steel cutting rules 6 inserted in the slot. As shown, the cutting rules are straight strips, but it should be understood that each strip may be shaped to different contours depending on the desired shape of the blank. Conventionally, each cutting rule is an elongated rectangular strip having a body portion 8 of generally rectangular cross section and a double-bevelled tapered cutting portion 10 having in cross section the shape of an isosceles triangle. The tapered cutting portion terminates in a cutting edge 12. As is readily apparent from FIGURE 1, when convention cutting rules are abutted with each other in an end-to-end relationship, as in making a corner, a space 14, or nick, remains between the cutting edges 12 of the abutted rules. Similarly, a space 16, or nick, remains when the end of one rule is abutted with the side of another rule. These spaces 14 and 16 result from the tapering of the cutting portions which does not permit the opposed cutting portions and cutting edges to engage each other.

As seen in FIGURES 2–4, the improved construction of the invention eliminates the space between the opposed cutting edges of the rules which are abutted in end-to-end relationship by altering the ends of the rules to permit the two cutting portions and cutting edges to engage each other. As shown, the end of each rule has been cut transversely along a plane which is perpendicular to the longitudinal axis of the rule and which makes an angle of 45 degrees with the axis in a horizontal direction. Thus, the end surfaces 18 resulting from the cuts will engage along not only their body portions but also along their cutting portions and cutting edges. It is apparent that the angle at which the ends of the cutting rules are cut may be varied to form smooth abutments at other than 90 degrees.

As seen in FIGURES 5–7, the improved construction eliminates the space between the opposed cutting edges of rules which are abutted in end-to-end relationship. In this configuration, the body portion 8 of the end-abutting rule 20 is cut transversely on a plane which is parallel to the side of the other rule. The cutting portion 10 is cut on a plane which is parallel to the opposed surface of the cutting portion 10 of the other rule and which intersects the first-named plane at the junction of the body and cutting portions. As shown, the end-abutting rule 20 joins the other rule at a 90 degree angle, but it will be apparent that the two rules may easily be joined at other angles.

Thus, the improved steel rule cutting die which results from the novel assembly method of the invention has a continuous cutting edge in distinction from conventional cutting dies in which the cutting edges of abutted rules are separated by a space. The elimination of the space results in a cleanly cut blank and a die which does not tend to collect fibrous waste at the juncture of the rules. In addition, when cutting material such as silk, rayon or other cloth, the improved die removes the need for welding or brazing the junctures between rules. When brazing or welding is eliminated, the cost of making the die is reduced and the rule retains its original hardness for a longer period.

What is claimed is:

In a method of making a steel rule cutting die of the type in which one double-bevelled cutting rule is disposed in angular end-to-end abutting relationship with another double-bevelled cutting rule, each of said rules having a body portion of generally rectangular transverse cross section and an integral cutting portion which in transverse cross section has generally the shape of an isosceles triangle the apex of which forms a cutting edge, the steps comprising: cutting away the body portion and the cutting portion at one end of each rule so that the body portions, cutting portions and cutting edges of abutting rules engage each other, said cutting operation being performed along a plane which extends perpendicular to the longitudinal axis of the respective rule and which extends through the body portion and cutting portion of the respective rule at an angle to the side of the respective body portion, said cutting operation forming an exposed end edge on each rule; forming intersecting rule-receiving slots in the surface of a base member at a right angle thereto; and inserting the body portions of said cutting rules in said slots with the exposed end edge of each rule disposed at the intersection of said slots and in engagement with the entire exposed end edge of the other rule whereby the space which would ordinarily occur between the cutting edges of abutting rules is eliminated.

References Cited by the Examiner
UNITED STATES PATENTS

| | | | |
|---|---|---|---|
| 2,298,041 | 10/42 | Dedrick | 76—107 |
| 2,313,801 | 3/42 | Carll | 83—690 X |
| 2,495,221 | 1/50 | Berlin. | |
| 2,524,962 | 10/50 | Dalsemer. | |
| 2,580,526 | 1/52 | Dawson | 30—303 X |
| 2,692,628 | 10/54 | Elsaesser | 30—302 X |
| 2,711,106 | 6/55 | Rylander. | |
| 2,863,337 | 12/58 | Ackley | 76—107 |
| 2,899,849 | 8/59 | Laughter | 76—107 |
| 3,000,251 | 9/61 | Berlin et al. | 83—690 |

GRANVILLE Y. CUSTER, JR., *Primary Examiner.*

CARL W. TOMLIN, FRANK E. BAILEY, *Examiners.*